J. L. FUREY.
COMBINED MACHINERY FOR PARING, CORING AND SLICING APPLES.
No. 174,513. Patented March 7, 1876.
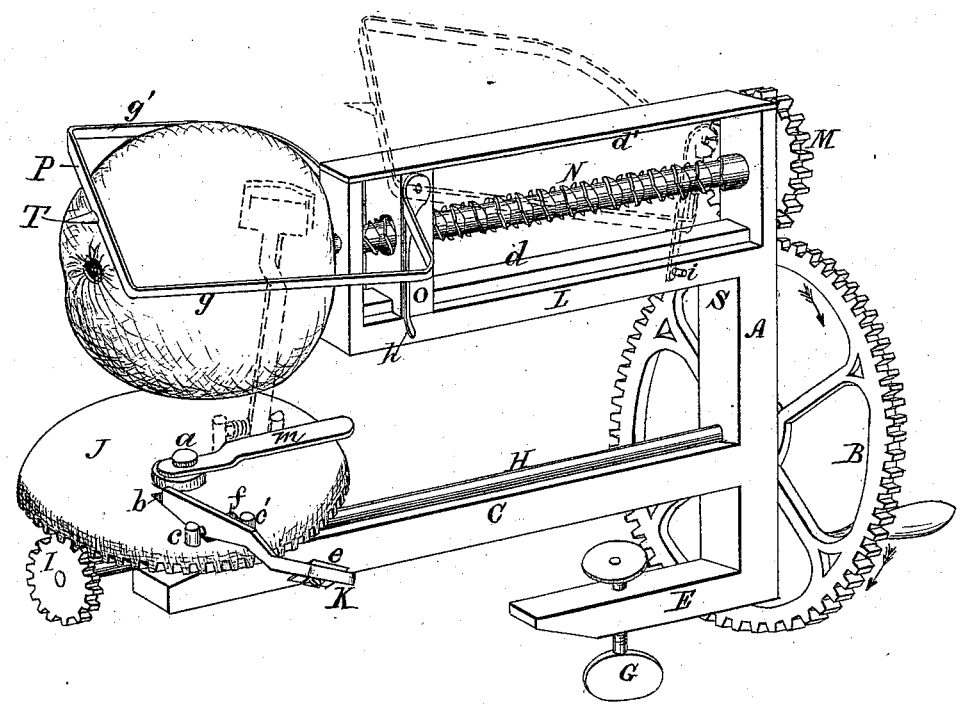
Witnesses;
Grenville Lewis
D. P. Cowl
Inventor
James L. Furey.
by Stansbury & Munn
his attys.

UNITED STATES PATENT OFFICE.

JAMES L. FUREY, OF BELLEFONTE, PENNSYLVANIA, ASSIGNOR OF ONE-HALF HIS RIGHT TO P. BENNER WILSON, OF SAME PLACE.

IMPROVEMENT IN COMBINED MACHINERY FOR PARING, CORING, AND SLICING APPLES.

Specification forming part of Letters Patent No. 174,513, dated March 7, 1876; application filed November 23, 1875.

*To all whom it may concern:*

Be it known that I, JAMES L. FUREY, of Bellefonte, Centre county, Pennsylvania, have invented certain Improvements in Apple Paring, Coring, and Cutting Devices; and I do hereby declare the following to be a full and correct description of the same, reference being had to the accompanying drawings, in which—

Figure 1 is a perspective view of the device, which consists of an apple-paring machine provided with a combined cutting and coring knife, arranged to be operated so as to cut the apple, as soon as pared, into a ribbon-strip, and at the same time coring it, the whole being done by one continuous operation.

In the drawing, S is a frame, made of metal or other suitable material, and consisting of an upright, A, with a single lower arm, C, with an upright stem, $a$, on its outer end, an upper double or slotted arm, L, and a finger, E, provided with a clamp, G, for attaching the device to a table or other suitable place for operation, all as clearly shown. In this frame, and just above the arm C, is mounted a shaft, H, having its bearings in the upright A and stem $a$. On its end, outside of the upright A, a driving-gear wheel, B, is attached, and on its opposite end a pinion-wheel, I, arranged to gear into a crown-wheel, J, on the stem $a$, as shown. Between two small posts, $c$ $c'$, on either side of a slot, $b$, in the crown-wheel J, is pivoted an arm, K, having a paring-knife, $e$, set in its outer end, and a spring, $f$, attached at the point where it is pivoted to throw it up at the proper time for operation and hold it there, and with its inner end extending through the slot $b$, so as to engage with a cam (not shown) under the crown-wheel, and be thrown and held back from the apple after it is pared and while it is being carried round under a guard-arm, $m$, attached to the stem $a$, all as shown. In the arm L, constructed as shown, is mounted a shaft, N, having a right and left hand screw-thread upon it, and provided at one end with a pinion-wheel, M, arranged to gear into the driving-wheel B, its opposite end extending beyond the outer end of the arm L and ending in a fork. Upon the shaft N is a nut, O, running on guides $d$ $d'$ in the arm L, so as to be moved backward and forward by the screw-threads upon the shaft. To this nut are pivoted two arms, $g$ $g'$, by a pin passing through it and connecting them rigidly. Their outer ends are connected by a cutting-knife, P, set a little diagonally and with its cutting-edge down, and provided, near its center, with a coring-knife, T, arranged as shown. To the arms $g$ $g'$ a finger, $h$, is attached rigidly at the point where they are pivoted, extending downward so as to engage with a pin, $i$, on the side of the arm L, as shown.

In operating this device, the wheel B is revolved in the direction of the arrows until the finger $h$ engages with the pin $i$ and throws the cutting-knife P up in the position shown by the dotted lines, and allows the paring-knife to come into the position shown by similar dotted lines. These positions of the knives are taken simultaneously. An apple is then placed upon the fork, and the revolution of the wheel B continued, when the apple is turned against the paring-knife, and the paring-knife is, at the same time, carried along the surface of the apple to its opposite end, paring it and throwing the pealing from the operator. At the same time the nut O moves forward to the end of the arm L, and carries the cutting and coring knife over the apple to its opposite end, as shown. The paring-knife is then thrown down by the cam under the crown-wheel, and the cutting and coring knife drawn against the pared apple, on a line parallel with the line of the center of the fork, and in its backward movement is kept in that line by any suitable means, if necessary. The apple, at the same time, is revolved against the moving knife, and is thus cored and sliced. The operation being completed, the finger $h$ again engages with the pin $i$, and the parts adjust themselves, as before, for the paring, cutting, and coring of another apple.

Having thus described my invention, what I claim is—

1. The cutting-knife P, constructed and arranged to operate substantially as and for the purpose set forth.

2. The slicing-knife P, provided with the coring device T, constructed and arranged, substantially as described, for the purpose of cutting and coring an apple at the same time, as set forth.

3. In combination with the knife P and nut O, the shaft N, provided with a right and left screw-thread, as herein shown and described, and for the purpose set forth.

4. In combination with the mechanism herein shown and described, the paring-knife E and the slicing-knife P, provided with the coring device T, constructed and arranged to pare, cut, and core an apple at a single continuous operation, as set forth.

The above specification of my said invention signed and witnessed at Bellefonte this 22d day of September, A. D. 1875.

JAMES L. FUREY.

Witnesses:
S. T. SHUGERT,
I. H. MORRISON.